(12) United States Patent
Chen et al.

(10) Patent No.: US 6,632,852 B1
(45) Date of Patent: Oct. 14, 2003

(54) NO-RUB FINISHING COMPOSITIONS

(76) Inventors: Frank Bor-Her Chen, 5613 Boxborough Ct., Greensboro, NC (US) 27407; Gregory David Muselman, 1810 Millhouse Ct., Greensboro, NC (US) 27407; Eugen Safta, 2461 W. Clemmonsville Rd., Winston-Salem, NC (US) 27127; Harvey Richard Forrest, 17782 Center Church Rd., Lexington, NC (US) 27295; George Matton, 3902 Cole Ave., High Pont, NC (US) 27265

( * ) Notice: Subject to any disclaimer, the term of this patent is extended or adjusted under 35 U.S.C. 154(b) by 0 days.

(21) Appl. No.: 09/698,691

(22) Filed: Oct. 27, 2000

Related U.S. Application Data

(60) Provisional application No. 60/161,804, filed on Oct. 27, 1999.

(51) Int. Cl.$^7$ ................................................ C08K 5/07
(52) U.S. Cl. ............................ 522/79; 522/80; 522/88; 522/120; 522/121; 522/141; 522/142; 523/300; 524/356; 524/361; 524/379
(58) Field of Search ................................. 427/508, 516; 522/79, 88, 120, 121, 141, 142, 80; 523/300; 524/356, 361, 379

(56) References Cited

U.S. PATENT DOCUMENTS

| | | |
|---|---|---|
| 4,066,582 A | 1/1978 | Babian et al. |
| 4,251,597 A | 2/1981 | Emmons et al. |
| 4,360,541 A | 11/1982 | Costanza et al. |
| 4,407,885 A | 10/1983 | Murphy et al. |
| 4,544,623 A | 10/1985 | Audykowski et al. |
| 4,654,233 A | 3/1987 | Grant et al. |
| 4,861,629 A | 8/1989 | Nahm |
| 5,750,186 A | 5/1998 | Frazzitta |
| 5,985,951 A | 11/1999 | Cook |
| 5,994,424 A | 11/1999 | Safta |

*Primary Examiner*—Susan W. Berman
(74) *Attorney, Agent, or Firm*—Barnes & Thornburg

(57) ABSTRACT

A self-leveling finishing composition capable of providing chemically resistant low profile coatings is described. The finishing composition comprises thermoplastic resin solids and thermosetting resin solids in a weight ratio of about 0.5:1 to about 11:1 and a solvent composition comprising a solvent capable of dissolving the thermoplastic resin solids component and a solvent miscible co-solvent capable of dissolving the thermosetting resin solids. The finishing composition is applied and dried to a dry-to-touch surface which is thereafter subjected to conditions capable of initiating polymerization of the component thermosetting resin solids. The finishing composition can be used as a substitute for more expensive or more labor intensive coating compositions in existing surface finishing protocols without compromise of surface quality and chemical resistance.

15 Claims, No Drawings

NO-RUB FINISHING COMPOSITIONS

CROSS REFERENCE TO RELATED APPLICATION

This application claims priority under 35 U.S.C. § 119(e) to U.S. Provisional Application Serial No. 60/161,804, filed Oct. 27, 1999, which is expressly incorporated herein by reference.

FIELD OF THE INVENTION

This invention relates to coating compositions for wood and other surfaces. The compositions are characterized by their component thermoplastic and thermosetting resin solids formulated in a solvent mixture selected to allow the composition to dry to a low profile, dry-to-touch surface coating. The dried coating is thereafter subjected to conditions selected to initiate polymerization of the component thermosetting resin solids to provide a low profile chemically resistant surface coating.

BACKGROUND AND SUMMARY OF THE INVENTION

In the manufacture of finished articles such as wood furniture, the most aesthetically pleasing finishes are obtained using nitrocellulose lacquers in a predefined finishing protocol using rubbing and buffing operations. The resulting finishes, while having high clarity and beauty, are not without some disadvantage, not only in the manufacturing process itself, but as well in several undesirable properties in the resultant coated surfaces. Firstly, the rubbing and buffing operations required to obtain high quality nitrocellulose finishes are very labor intensive. Further, the coatings themselves exhibit poor resistance to abrasion, marring, and solvent/chemical attack.

There has been significant research and development effort to design new coating formulations to provide nitrocellulose lacquer-like finishes that do not suffer the disadvantages of poor resistance to abrasion and chemical attack nor the labor intensive manufacturing operations. Thus, for example, coating formulations have been proposed that include high solids UV curable coatings, to provide good chemical resistance. However, the coating formulations developed to contain high solids levels of thermosetting components are expensive and do not have the dry-to-touch property of a conventional nitrocellulose lacquer. On the other hand, new nitrocellulose lacquers have been developed to have good flowability and low drying rates to provide smooth dried coatings without need for subsequent rubbing and buffing steps. The use of slow-drying formulations complicates the manufacturing process because of the required lower line speeds. Other technologies, including modified UV-curable coatings, for example those described in U.S. Pat. Nos. 4,654,223 and 4,407,885 have been used as protective topcoats with the dry-to-touch property, but at higher cost and the requirement of some rubbing/buffing to produce the desired quality lustrous finishes. Other researchers have sought to address these issues by combining UV curable resins with low amounts of nitrocellulose polymers to improve coating holdout (see U.S. Pat. No. 4,066,582). Still other researchers have sought to provide coatings capable of providing low labor-intensive quality finishes with good chemical resistance by formulating photocurable coating compositions comprising polyfunctional ethylenically unsaturated cellulosic polymers. In other words, the classical thermoplastic polymer components of the coating compositions are functionalized with UV curable moieties that allow the polymers to be photochemically crosslinked on the substrate surfaces (see U.S. Pat. No. 4,861,629). Such coatings, while exhibiting good aesthetic properties and chemical resistance, are also expensive.

The present invention provides novel coating formulation technology based on selection of both thermoplastic resin and thermosetting resin components in a predefined weight ratio in a solvent composition including a solvent capable of dissolving the thermoplastic resin solids and a solvent miscible co-solvent capable of dissolving the thermosetting resin solids. Preferably at least one of the solvent or co-solvent or at least one of the thermosetting resin components is hydroxyfunctional. The presence of hydroxyfunctionality in the present formulation has been found to improve flow characteristics during application and during pre-set drying to provide low profile, high luster surfaces without need for rubbing or buffing operations. The resulting dry-to-touch coating composition can then be exposed to predetermined conditions calculated to effect crosslinking/setting of the thermosetting resin solids component of the pre-dried coating. The resultant coatings in accordance with this invention not only exhibit a high quality, lustrous finish, but they also exhibit excellent resistance to marring, abrasion and solvent/chemical attack. The coating formulations can be adjusted to control gloss, they can be formulated to be low-Haps or Haps-free, and they are extremely cost competitive when used as a substitute for nitrocellulose lacquers and other finishing compositions in, for example, furniture finishing protocols. Further, the compositions can be readily used on other surface substrates including metal, leather and plastics.

The self-leveling finishing compositions of the present invention, in addition to the major components mentioned above, can be formulated to include other art-recognized coating excipients/modifiers including, for example, wetting agents, flow and leveling aids, slip and mar resistant aids, thermoset solids dependent photoinitiators, gloss control agents, pigments and the like. The use of such additives to fine tune the properties of coating compositions is well known in the art and such knowledge can be applied to adjust the properties of the present coating compositions to meet the functional requirements of each targeted application of the present formulations.

DETAILED DESCRIPTION OF THE INVENTION

The present invention is based in part on the discovery that the appearance and other surface properties provided by solvent-based coating compositions including both thermosetting and thermoplastic resin solids components can be controlled significantly by selection of solvents used to formulate such coating compositions. The production of dried low profile coatings on substrate surfaces requires that the compositions be formulated so that the high molecular weight oligomers and polymer components in such composition are able to disaggregate and settle under the influence of gravity even in the late stages of the drying process. The intramolecular affinities of polymer components, even in the presence of the organic solvent medium used to formulate coating compositions, are such that the polymer components tend to aggregate in the composition and such polymer aggregates can often be more pronounced in the later stages of drying of applied films of the coating composition (i.e., when the solvent concentrations are reduced) resulting in irregularity in the surface of the dried coating films. It has been found in accordance with the present invention that coating compositions can be formulated with both thermoplastic resin solids and thermosetting resin solids, to take advantage of the functional properties available from each of such resin components, by dissolving such resin solids in a solvent composition comprising a solvent capable of dissolving the thermoplastic resin solids and a solvent miscible co-solvent capable of dissolving the thermosetting resin solids. Preferably at least one of the solvents or co-solvents is hydroxyfunctional or ketone-functional. The polar nature of such solvents facilitate the disaggregation of the higher molecular weight resin components and tend to promote disaggregation of polymer components and flow of the applied coating to help provide low profile, dry-to-touch coatings that can be subsequently subjected to conditions capable of initiating polymerization of the thermosetting resin solids components of the composition. The resulting thermoset coatings are characterized by their low profile and high luster and, consequent to the thermoset processing of the thermosetting resin components, excellent mar/chemical resistance.

Additional solvents or coupling agents can be added to enhance the miscibility of the solvent and co-solvent and/or the compatibility of the thermosetting and thermoplastic resin components, particularly in the late stages of drying to help prevent the partial/selective precipitation of a subset of the resin solids components during the process of drying of the applied film coating. Actually such compatibility factors can be used to control gloss and clarity of the present coating compositions. By adjusting the ratios of solvent/co-solvent/coupling agents on an empirical basis one can effectively adjust coating appearance properties.

Further, one or more additional solvents can be added to control the drying characteristics of the composition, i.e., to enhance or retard the rate of drying, to improve the end-product coating characteristics. Indeed, one or more solvent additives can be included in the composition in amounts determined empirically to improve coating drying characteristics and surface quality. Other additives such as flow and leveling aids, surfactants, wetting agents, pigments or stains can be added in accordance with art-recognized protocols to adjust the film forming and film drying characteristics of the coating composition.

Thus, in accordance with the present invention there is provided a self leveling finishing composition for providing durable low profile coatings. The composition comprises about 10 to about 65% by weight of resin solids comprising about 15 to about 65% by weight thermoplastic resin solids, and about 5 to about 50% by weight of thermosetting resin solids wherein the weight ratio of thermosetting resin solids to thermoplastic resin solids is about 0.5:1 to about 11:1; and about 35% to about 90% by weight of a solvent composition comprising a solvent capable of dissolving the thermoplastic resin solids and a solvent miscible co-solvent capable of dissolving the thermosetting resin solids. The term "solvent miscible co-solvent" as used herein refers to a co-solvent that can be blended with the solvent and the resin solids components of the present formulation, optionally with one or more additional coupling agents or compatibility agents as are known in the art, to form a substantially homogeneous coating composition.

The nature of the thermoplastic resin solids and the thermosetting resin solids components of the composition is not critical provided that the finishing composition can be dried to a substantially clear, homogeneous, low profile coating that can be subsequently subjected to conditions capable of initiating polymerization of the thermosetting resin solids component of the composition while maintaining coating continuity and luster.

While the nature of the thermoplastic resin solid component is not critical, it is typically selected from the group consisting of nitrocellulose, cellulose acetate-butyrate, alkyd resin, polyester resin, urethane resin, acrylic resin, or epoxy resin or some combination of two or more of such thermoplastic polymer components. Such resins are well known in the art and available from a wide variety of commercial sources.

Similarly the nature of the thermosetting resin solids component of the present composition is not critical provided that the nature of the thermoset functionality is taken into account so that the necessary catalyst or initiator components are also included in the formulation in an amount effective to help initiate and propagate polymerization of the dry-to-touch coating. Effective crosslinking or thermoset reaction of the thermoset resin components also will inherently require that the thermosetting components be present in a concentration sufficient to assure proximity of reactive chemical entities in the dry-to-touch preset applied film composition. Higher functional group concentrations in the dried film provides higher probability of crosslink concentration effective to impart the desired mar/chemical resistance to the thermoset coatings. Examples of suitable thermosetting resin solids components include components having free radical-polymerizable functional groups such as olefin, more preferably acrylic/acrylate, or methacrylic/methacrylate functionality. Such free radical thermosetting resin solid components include monomers, oligomers and polymers bearing from 1 to about 6 olefin/acrylate or methacrylate functional groups. Such thermosetting resin components are well known in the art and their use alone or in combinations can be selected to achieve, crosslink levels in the thermoset films suitable to meet the physical and chemical properties required by the targeted application of the low profile finish composition.

When radical polymerizable thermosetting resin compositions are utilized as the thermoset resin solid component of the present invention and the crosslinking step is to be initiated by other than incident x-ray or e-beam radiation, it is typical to include one or more radical initiators into the composition at a level sufficient to assure optimum crosslinking of the olefin functional components. Such radical initiators are well known in the art and can be selected for thermoactivation, for example, peroxide-based radical initiators or by incident actinic radiation, for example UV radiation. Such initiators are typically used at a level ranging from about 0.1 to about 5% by weight of the thermoset resin solids in the composition.

Other art-recognized thermosetting resin solids compositions can be utilized in the present self leveling finishing compositions. Thus, for example, the thermosetting components can include blocked isocyanates and polyhydroxy/amino functional compounds, polycarboxylic acids and polyhydric alcohols, and the like. The only significant limitation on selection of the thermosetting components of the present self leveling finishing compositions is that the dried coating and the substrate be such that it can be subjected to conditions, i.e., incident thermal or actinic energy, sufficient to effect polymerization of at least a portion of the thermoset components of the composition. Such crosslinking reaction is typically carried out after the composition is applied to the substrate surface receiving said finish and dried for a period of time, typically less than an hour, more preferably less than 30 minutes, to a dry-to-touch texture prior to exposing the substrate and the coating to the thermoset conditions.

The solvent components of the present self leveling coating composition are selected empirically based on the thermosetting and thermoplastic resin components. The solvents can be selected from any of the art-recognized solvents used in coating compositions included, but not limited to, ketones, for example acetone, methyl ethyl ketone, methyl isobutyl ketone, cyclohexanone and the like; esters, for example n-butyl acetate, sec-butyl acetate, isobutyl acetate, isopropyl acetate, ethyl acetate, methyl propionate, ethyl propionate, and the like; ethers such as diethyl ether, dioxane, and tetrahydrofuran; aromatic solvents such as xylene and toluene; aliphatic solvents such as petroleum ethers and ligroin, alcohols such as methanol, ethanol, isopropanol; butanol, propylene glycol, glycolic acid n-butyl ester, isobutyl alcohol, and the like; amides such as N,N-dimethylformamide, N,N-dimethylacetamide, N-methylpyrrolidinone and the like; sulfoxides, such as dimethyl sulfoxides and sulfones, such as sulfolane or dimethylsulfone. The selection of solvent/co-solvent components of the present invention are often determined empirically based on the selected thermosetting resin solid component and thermoplastic resin solids component of the composition. Thus the solvent composition component of the present self leveling coating composition comprise a solvent capable of dissolving at least a portion of the thermosetting resin solids component and a co-solvent capable of dissolving at least a portion of the thermosetting resin component such that the combination of the solvent components and the thermoplastic and thermosetting resin components can be formulated into a homogeneous solution optionally in combination with coupling agents, solvents or compatibilizing solvents. Preferably at least a portion of the thermosetting resin components or the solvent/co-solvent composition includes hydroxyfunctionality. It has been found that hydroxyfunctionality, while increasing the polarity of the medium and to some extent the drying time, helps to disaggregate, at the molecular level, thermoplastic and thermosetting resin components, thereby enabling excellent flow/leveling properties in the composition thereby allowing, upon drying of applied films of the composition, formation of a low profile coating surface. Additional solvent components can be included in the composition (as well as other art-recognized coating excipients) to control drying rates of the composition. Thus in applications where the drying rate of the applied coatings is to be enhanced, solvents with lower boiling points can be selected as an additive or as a substitute for a portion of either the solvent or co-solvent components of the base formulation.

Application of the present self leveling coating compositions of the present invention involves application of the coating composition to the surface to be finished using any one of the art-recognized known coating techniques, including but not limited to, spray-on, brush-on, wipe-on, or dipping techniques. The coated surface is then flash dried. The solvent/solids composition components of the coating formulation is usually selected so that the applied coating composition can dry to a "dry-to-touch" surface within a period of time of less than about 2 hours, more typically less than 1 hour, most preferably less than ½ hour. The term "dry-to-touch" as used in describing the application and properties of the present intermediate coatings is the property of a composition coated, dried surface, that can be touched with a dry finger without visually detectable distortion of the surface profile and without exhibiting a tacky feel. The dried surface of the coating composition of the present invention exhibits a low profile high luster quality and retains that quality after the substrate/surface is subjected to conditions calculated to initiate and propagate polymerization of the thermosetting components of the dried coating composition. Such can be accomplished by heating for a predetermined period of time in, for example, an infrared oven or by exposing the surface to other actinic radiation, for example electron beam, x-ray or UV radiation, preferably UV radiation, for a period of time sufficient to effect crosslinking of at least a portion of the thermosetting components of the dried coating composition. The resulting thermoset low profile finish exhibits excellent mar/chemical resistance.

The following examples provide formulations illustrative of those within the scope of the present invention. It is intended that the invention not be limited by virtue of the recitation of the following formulations, but instead that the formulations be considered but illustrative of the various embodiments of the invention. Variations of such formulations and their equivalents will be readily apparent to those of ordinary skill in the art.

Formulation 1 (ESA 11075): "No Rub" UV-curable NC Lacquer

| Ingredient | Weight Percent |
|---|---|
| aromatic monoacrylate (Sartomer CN-131) | 1.80 |
| aliphatic diacrylate (Sartomer CN-132) | 1.80 |
| acrylic acid ester (Photomer 4127) | 1.80 |
| pentaactylate ester (Sartomer SR-9041) | 4.30 |
| urethane acrylate (Radcure EB-8301) | 2.70 |
| polydimethylsiloxane (Tegoglide 410) | 0.20 |
| polyethersiloxane (BYK 346) | 0.40 |
| ethoxyacetyldiol (Surfynol 440) | 1.00 |
| Glycoether PM | 1.80 |
| Glycoether PP | 1.80 |
| propylene glycol | 7.70 |
| n-butyl acetate | 35.00 |
| iso-butyl acetate | 1.80 |
| ethyl acetate | 3.60 |
| acetone | 19.70 |
| cellulose nitrate (Parcell R-20) | 12.50 |
| benzophenone | 0.35 |
| photo initiator (Daracure II 73) | 0.80 |
| photo initiator (Irgacure 184) | 0.50 |
| photo initiator (Irgacure 1800) | 0.10 |
| silicone dioxide (OK 412) | 0.35 |

Formulation 2 (ESA 11076): Conventional NC Lacquer

| Ingredient | Weight Percent |
|---|---|
| hydrocarbon petroleum (Calumet 210-245) | 4.86 |
| toluene | 8.08 |
| xylene | 4.11 |
| iso-propanol | 5.13 |
| iso-butyl alcohol | 10.13 |
| aliphatic hydrocarbon (VM & P naphtha) | 4.15 |
| iso-butyl iso-butyrate | 7.32 |
| methyl ethyl ketone | 4.51 |
| silicone solution | 0.15 |
| defoamer | 0.48 |
| alkyd resin (MCW 207 1109 Alkyd) | 7.32 |
| vegetable oil | 3.68 |
| diisononyl phthalate | 3.20 |
| nitrate cellulose solution (30/35 COS) | 32.36 |
| phosphoric acid | 0.02 |

| Formulation 3 (ESA 11077): Conventional Catalyzed Lacquer | |
| --- | --- |
| Ingredient | Weight Percent |
| coconut alkyd | 33.37 |
| butylated urea-formaldehyde (Beetle 1050) | 18.03 |
| Cymel 301 | 5.48 |
| toluene | 12.74 |
| VM & P naphtha | 2.93 |
| n-propyl alcohol | 5.71 |
| ethyl alcohol | 5.49 |
| butyrate solution | 8.90 |
| butyl benzyl phthalate (Santicizer 160) | 0.60 |
| Byk 320 | 0.14 |
| Byk 077 | 0.18 |
| Syloid 169 | 0.51 |

TABLE 1

The Results of Physical Tests

| Type of NC Lacquer Finishing | Clarify (40° sheens) | Mar Resistance | Flexibility | Adhesion | Scratch Resistance | Abrasion Resistance | Cold Check | Impact Resistance | Print Resistance |
| --- | --- | --- | --- | --- | --- | --- | --- | --- | --- |
| No Rub NC Protective Lacquer (ESA-11075) | 10* | 10 | 8 | 10 | 10 | 10 | 10 | 9 | 10 |
| Conventional NC Lacquer (ESA-11076) | 9 | 3 | 10 | 9 | 1 | 3 | 10 | 9 | 6 |
| Super Catalyzed NC Lacquer (ESA-11077) | 8 | 10 | 0 | 0 | 10 | 6 | 7 | 9 | 8 |

TABLE 2

The Results of Chemical Tests

| Type of NC Lacquer Finishing | Edge Soak Test | Acetone R* | Acetone S* | IPA | MEK R | MEK S | CH$_3$OH | Vodka | Plasticizer | Windex | Hot Water | Floor Cleaner |
| --- | --- | --- | --- | --- | --- | --- | --- | --- | --- | --- | --- | --- |
| No Rub NC Protective Lacquer (ESA-11075) | 10 | 10 | 9 | 10 | 10 | 9 | 9 | 10 | 10 | 9 | 9 | 10 |
| Conventional NC Lacquer (ESA-11076) | 9 | 0 | 0 | 9 | 0 | 0 | 0 | 9 | 0 | 9 | 9 | 8 |
| Super Catalyzed NC Lacquer (ESA-11077) | 9 | 9 | 7 | 10 | 8 | 7 | 9 | 10 | 9 | 9 | 8 | 9 |

*R = Rub Test
S = Spot Test

Formulation 4 is an example of visible light curable nitrocellulose protective lacquer with "no rub" feature.

| Formulation 4 (ESA 11563): Visible Light Curable NC Protective Lacquer | |
| --- | --- |
| Ingredient | Weight Percent |
| Acrylic acid ester | 1.70 |
| proproxylated TMPTA | 1.70 |
| penta acrylic monomer | 4.40 |
| glycolic acid n-butyl ester | 12.00 |

-continued

| Formulation 4 (ESA 11563): Visible Light Curable NC Protective Lacquer | |
| --- | --- |
| Ingredient | Weight Percent |
| urethane acrylate | 4.70 |
| acetone | 25.00 |
| cellulose nitrate | 12.30 |
| phosphine oxide, phenilbis(2,4,6-trimethylbenzoyl) | 1.80 |
| polyethersiloxane | 0.50 |
| n-butyl acetate | 35.40 |
| polydimethylsiloxane | 0.50 |

Formulation 5 is an example of a water white UV-curable acrylic protective lacquer.

| Formulation 5 (ESA 11573-B): UV-curable Acrylic Protective Lacquer | |
| --- | --- |
| Ingredient | Weight Percent |
| Butyl acetate | 20.27 |
| acetone | 37.00 |
| polyethersiloxane | 0.45 |
| acrylic polyol | 18.18 |
| glycolic acid n-butyl ether | 7.27 |
| acrylic acid ester | 4.09 |
| proproxylated trimethylpropanetriacrylate | 3.18 |

-continued

Formulation 5 (ESA 11573-B): UV-curable Acrylic Protective Lacquer

| Ingredient | Weight Percent |
|---|---|
| pentaacrylate monomer | 2.45 |
| polydimethylsiloxane | 3.00 |
| photoinitiator | 4.00 |

Formulation 6 is an example of a "no rub" protective nitrocellulose lacquer which can be cured thermally without the irradiation of light.

Formulation 6 (ESA 11565): "No Rub" Protective NC Lacquer

| Ingredient | Weight Percent |
|---|---|
| proproxylated TMPTA1.40 | 1.40 |
| acrylic acid ester | 1.40 |
| penta acrylate | 3.50 |
| urethane acrylate | 3.70 |
| n-butyl acetate | 32.00 |
| acetone | 16.50 |
| glycolic acid n-butyl ester | 9.00 |
| polyethersiloxane | 0.40 |
| cellulose nitrate | 12.00 |
| polydimethylsiloxane | 1.00 |
| N,N-dimethyl-2,6 diisopropylaniline | 0.92 |
| 5,7-diiodo-3 butoxy-6-fluorone | 0.08 |
| 3,4 epoxycyclohexyllmethyl 3,4 epoxylcyclohexylcarboxylate | 18.10 |

Formulation 7 (ESA 11474): "No Rub" Acrylic Lacquer

| Ingredient | Weight Percent |
|---|---|
| VM & P naphtha | 6.00 |
| isobutylacetate | 8.00 |
| isopropyl alcohol | 8.00 |
| butylphthalate | 2.00 |
| glycolic acid n-butyl ester | 3.00 |
| acrylic polyol | 8.00 |
| butyl acetate | 19.50 |
| acetone | 20.00 |
| isobutyl alcohol | 17.00 |
| polyethersiloxane | 0.50 |
| cellulose acetate butyrate | 8.00 |

Formulation 8 (JBCAB1): "Non-yellowing UV-curable Protective Furniture Coating

| Ingredient | Weight Percent |
|---|---|
| PM acetate | 7.60 |
| methyl n-amylketone | 11.75 |
| n-butyl acetate | 15.76 |
| acetone | 40.74 |
| di-acrylate | 1.18 |
| proproxylated PMPTA | 1.18 |
| penta acrylate | 1.18 |
| cellulosic acrylic butyrate | 10.97 |
| urethane acrylate | 4.31 |
| silicone additive | 1.52 |
| photo-initiator | 3.92 |

Formulation 9 (ESA11898): Pigmented White UV-curable Protective Furniture coating

| Ingredient | Weight Percent |
|---|---|
| PM acetate | 5.40 |
| Isobutyl isobutyrate | 8.42 |
| n-butyl acetate | 11.16 |
| acetone | 29.16 |
| di-acrylate | 0.86 |
| proproxylated PMPTA | 1.44 |
| penta acrylate | 2.38 |
| cellulosic acrylic butyrate | 10.08 |
| urethane acrylate | 4.25 |
| silicone additive | 0.50 |
| talc | 6.48 |
| $TiO_2$ | 15.12 |
| photo-initiator | 4.75 |

Formulation 10: Hot Spray UV-curable Nitrocellulosic Lacquer

| Ingredient | Weight Percent |
|---|---|
| Isobutyl alcohol | 6.55 |
| acetone | 3.93 |
| glycol ether PP | 0.21 |
| ethyl acetate, 99% | 3.93 |
| n-butyl acetate | 44.20 |
| nitrocellulosic resin | 11.52 |
| silicone additive | 0.14 |
| di-acrylate | 2.40 |
| proproxylated PMPTA | 2.40 |
| penta acrylate | 4.80 |
| urethane acrylate | 6.44 |
| aromatic urethane acrylate | 2.11 |
| UV-curable nitrocellulosic resin | 6.00 |
| photo-initiator | 5.38 |

We claim:

1. A self-leveling finishing composition for providing durable low profile coatings, said composition comprising:

about 10 to about 65% by weight of resin solids comprising about 15% to about 65% by weight non-thermosetting thermoplastic resin solids, and about 5 to about 50% by weight of thermosetting resin solids wherein the weight ratio of thermosetting resin solids to non-thermosetting thermoplastic resin solids is about 0.5:1 to about 11:1; and about 35% to about 90% by weight of a solvent composition comprising a solvent capable of dissolving the non-thermosetting thermoplastic resin solids and a solvent miscible co-solvent capable of dissolving the thermosetting resin solids wherein the solvent and the co-solvent are selected so that the composition, when applied to a surface by a conventional coating method, is capable of flash drying to a dry-to-touch surface coating within less than one hour at ambient temperature.

2. The composition of claim 1 wherein the thermoplastic component is selected from the group consisting of nitrocellulose, cellulose acetate-butyrate, alkyd resin, polyester resin, urethane resin, acrylic resin and epoxy resin.

3. The composition of claim 2 further comprising an effective amount of a flow additive.

4. The composition of claim 1 wherein the thermosetting resin solids are thermally-curable.

5. The composition of claim 1 wherein the thermosetting resin solids are curable by a free radical mechanism.

6. The composition of claim 5 wherein the thermosetting resin component is selected from UV curable monomers, oligomers and polymers, each having up to 6 reactive olefin functional groups.

7. The composition of claim 1, 2, 3, 4 or 5 wherein at least one of the solvent or co-solvent is hydroxy functional.

8. The composition of claim 1, 2, 3, 4 or 5 wherein at least one of the solvent or co-solvent is ketone-functional.

9. The composition of claim 8 further comprising a hydroxy functional compatibilizing solvent.

10. The composition of claim 1 wherein the ratio of thermoplastic to thermosetting resin solids, and the solvent and the co-solvent are selected so that the composition, when applied to a surface by a conventional coating method, is capable of flash drying to a dry-to-touch surface coating within less than 30 minutes at ambient temperature.

11. The composition of claim 1 wherein the weight ratio of thermoplastic to thermosetting resin solids is about 1:1 to about 6:1.

12. The composition of claim 1 wherein the dry-to-touch coating presents a clear, low profile surface.

13. A method for producing a low-profile, mar resistant coating on a surface, said method comprising the steps of applying a composition of claim 1 to coat said surface;

drying said applied composition until dry-to-the-touch;

subjecting the dried composition to conditions capable of initiating polymerization of the thermosetting resin solids in said composition.

14. The method of claim 13 wherein the thermosetting resin solids are curable by a free radical mechanism and the dried composition is subjected to incident actinic radiation.

15. The method of claim 13 wherein the thermosetting resin solids are thermally curable and the dried composition is subjected to heating to a temperature effective to cure the thermosetting resin solids.

* * * * *